United States Patent
Asada

(10) Patent No.: US 11,937,205 B2
(45) Date of Patent: Mar. 19, 2024

(54) BASE STATION DEVICE, BASE-STATION MANAGEMENT SYSTEM, SERVER DEVICE, AND CONTROL METHOD

(71) Applicant: NEC Corporation, Tokyo (JP)

(72) Inventor: Shiro Asada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/708,243

(22) Filed: Mar. 30, 2022

(65) Prior Publication Data

US 2022/0353137 A1 Nov. 3, 2022

(30) Foreign Application Priority Data

Apr. 28, 2021 (JP) .................................. 2021-075581

(51) Int. Cl.
| | |
|---|---|
| H04W 64/00 | (2009.01) |
| H04L 41/0806 | (2022.01) |
| H04W 4/02 | (2018.01) |
| H04W 84/04 | (2009.01) |
| H04W 4/029 | (2018.01) |
| H04W 16/18 | (2009.01) |

(52) U.S. Cl.
CPC ....... *H04W 64/003* (2013.01); *H04L 41/0806* (2013.01); *H04W 4/025* (2013.01); *H04W 84/045* (2013.01); *H04W 4/029* (2018.02); *H04W 16/18* (2013.01)

(58) Field of Classification Search
CPC .......................... H04L 41/0806; H04W 16/18; H04W 84/045; H04W 4/029; H04W 64/003; H04W 4/025
See application file for complete search history.

(56) References Cited

U.S. PATENT DOCUMENTS

| | | | | |
|---|---|---|---|---|
| 6,266,332 B1* | 7/2001 | Koivu | ................... | H04W 24/00 370/336 |
| 2009/0316671 A1* | 12/2009 | Rolf | ..................... | H04W 4/029 370/338 |
| 2013/0196713 A1* | 8/2013 | Anbe | ................. | H04W 64/003 455/561 |
| 2014/0302873 A1* | 10/2014 | Halfmann | .......... | H04W 64/003 455/456.1 |
| 2015/0024795 A1* | 1/2015 | Brend | ................... | H04W 48/12 455/466 |
| 2019/0116500 A1* | 4/2019 | Bendlin | ................ | H04W 24/10 |

FOREIGN PATENT DOCUMENTS

| | | |
|---|---|---|
| JP | 2008-193525 A | 8/2008 |
| JP | 2010-103686 A | 5/2010 |

* cited by examiner

*Primary Examiner* — Gregory Todd
(74) *Attorney, Agent, or Firm* — Sughrue Mion, PLLC

(57) ABSTRACT

A base station device includes: a memory; and a processor coupled to the memory, wherein the processor is configured to: execute control for transmitting, when the base station device is started, location information relevant to the base station device to a server device; execute control for receiving, from the server device, setting information relevant to the location information, the setting information being used for setting the base station device; and execute initial setting of the base station device by using the setting information.

9 Claims, 10 Drawing Sheets

BASE STATION DEVICE, BASE-STATION MANAGEMENT SYSTEM, SERVER DEVICE, AND CONTROL METHOD

This application is based upon and claims the benefit of priority from Japanese Patent Application No. 2021-075581, filed on Apr. 28, 2021, the disclosure of which is incorporated herein in its entirety by reference.

TECHNICAL FIELD

The present disclosure relates to a base station device and the like.

BACKGROUND ART

In recent years, a radio communication system including a base station device is widely known (see, for example, PTL 1). In a technique described in PTL 1, when a base station device is newly installed in a predetermined location and then the installed base station device is started based on so-called "cold start", initial setting, restart, and the like of the base station device are executed. At that time, information and the like to be used for setting the base station device are downloaded from a server device (see, for example, paragraphs [0046] to in PTL 1).

As a related art, a technique described in PTL 2 is also known.

[PTL 1] Unexamined Japanese Patent Application Publication No. 2008-193525

[PTL 2] Unexamined Japanese Patent Application Publication No. 2010-103686

SUMMARY

An example object of the present disclosure is to provide a base station device and the like capable of easily achieving initial setting of a base station device.

A base station device according to an example aspect of the present disclosure includes: a memory; and a processor coupled to the memory, wherein the processor is configured to: execute control for transmitting, when the base station device is started, location information relevant to the base station device to a server device; execute control for receiving, from the server device, setting information relevant to the location information, the setting information being used for setting the base station device; and execute initial setting of the base station device by using the setting information.

A server device according to an example aspect of the present disclosure includes: a memory; and a processor coupled to the memory, wherein the processor is configured to: execute control for receiving location information transmitted by a base station device at a time of start of the base station device, the location information being relevant to the base station device; select, from among a plurality of pieces of setting information relevant to a plurality of pieces of location information indicating locations different from one another, setting information relevant to the location information transmitted by the base station device; and execute control for transmitting, to the base station device, setting information to be used for initial setting in the base station device, the setting information being selected by the processor.

A control method according to an example aspect of the present disclosure is a control method for a base station device, the method including: executing control for transmitting, when the base station device is started, location information relevant to the base station device to a server device; executing control for receiving, from the server device, setting information relevant to the location information, the setting information being used for setting the base station device; and executing, initial setting of the base station device by using the setting information.

BRIEF DESCRIPTION OF THE DRAWINGS

Exemplary features and advantages of the present disclosure will become apparent from the following detailed description when taken with the accompanying drawings in which.

EXAMPLE EMBODIMENT

Hereinafter, an example embodiment according to the present disclosure is described in detail with reference to the accompanying drawings.

First Example Embodiment

Figure 1:
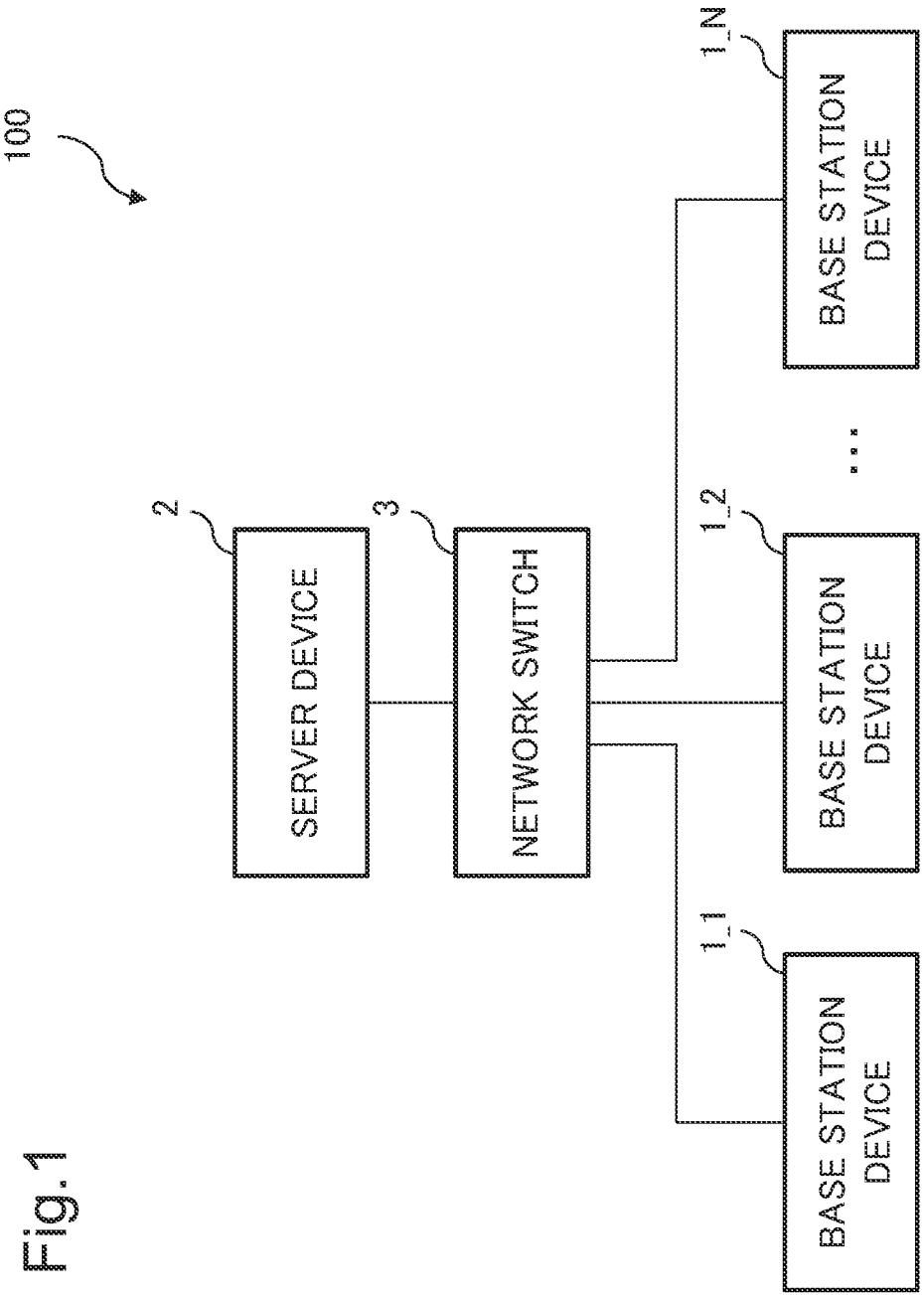
FIG. 1 is a block diagram illustrating main units of a base-station management system according to a first example embodiment.
Figure 2:
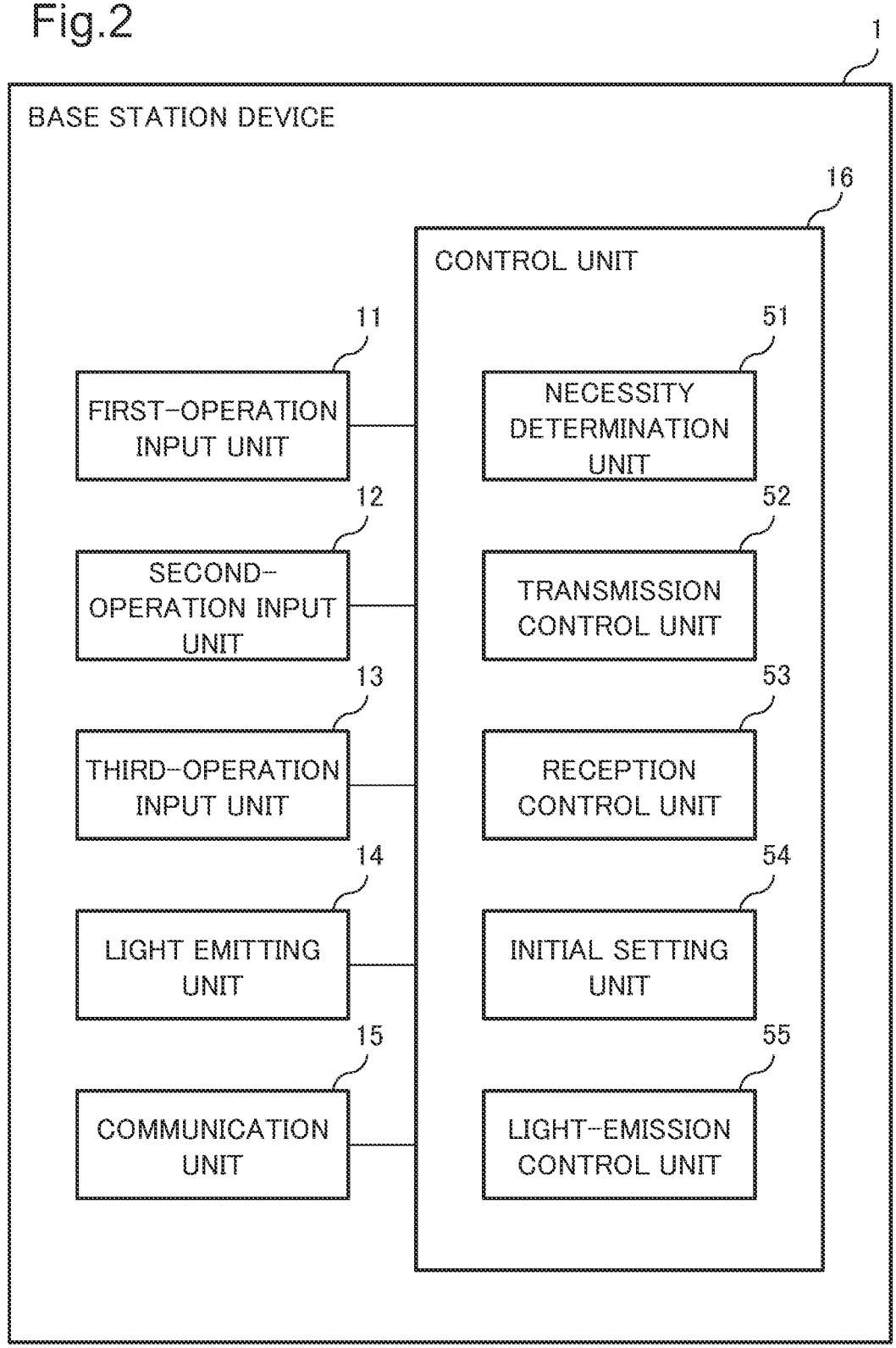
FIG. 2 is a block diagram illustrating main units of a base station device according to the first example embodiment.
Figure 3:
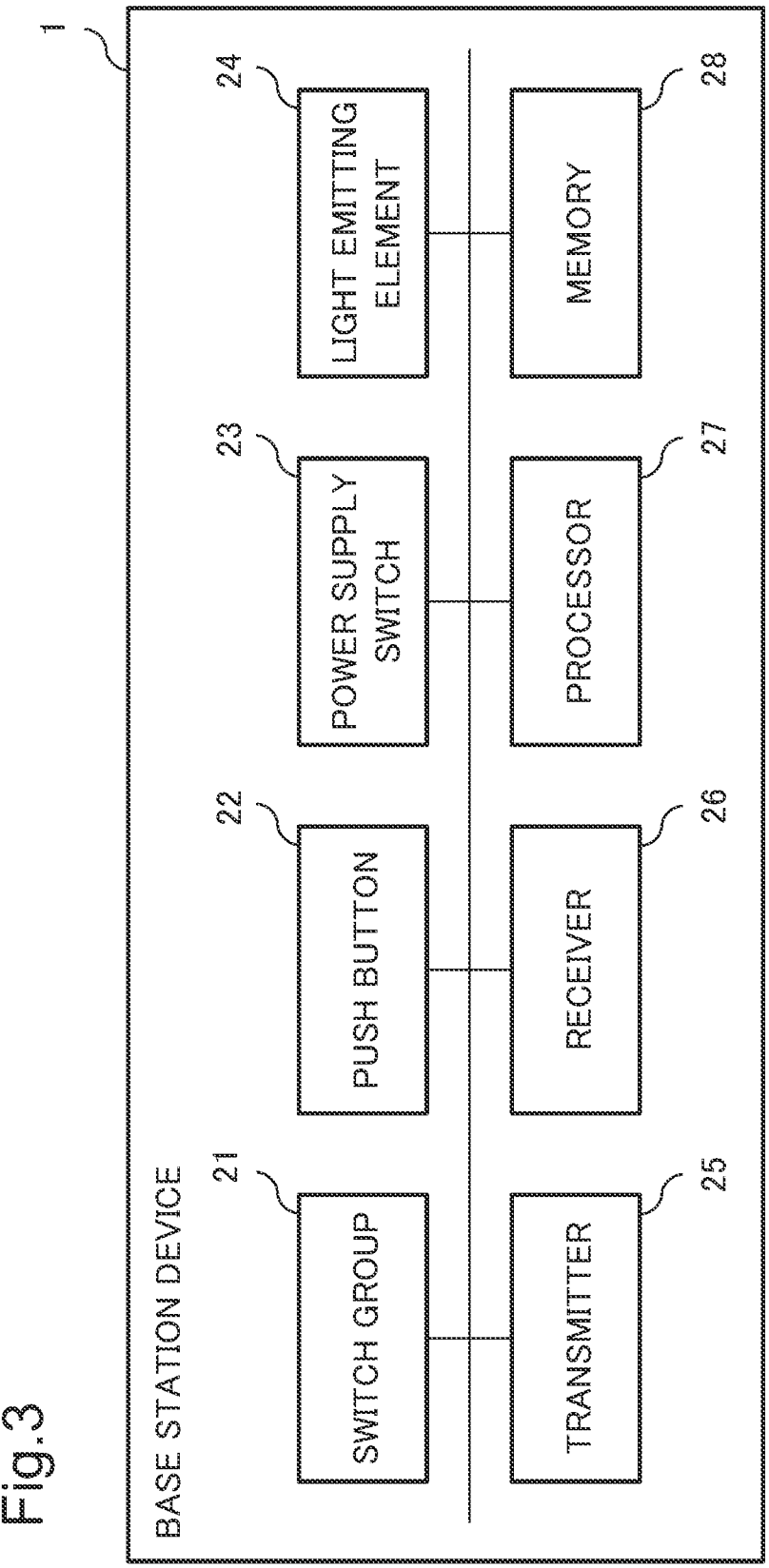
FIG. 3 is a block diagram illustrating a hardware configuration of main units of the base station device according to the first example embodiment.
Figure 4:
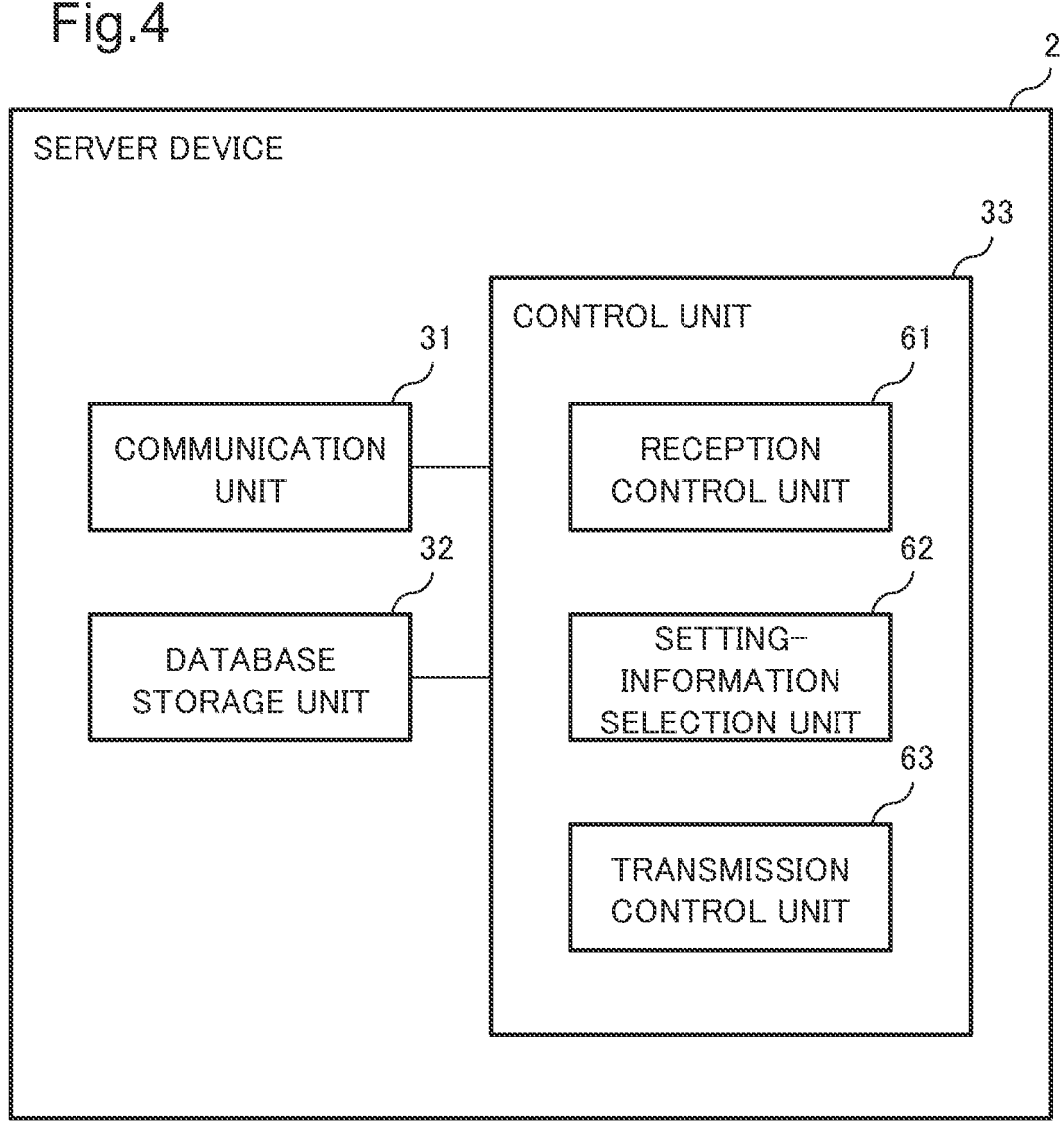
FIG. 4 is a block diagram illustrating main units of a server device according to the first example embodiment.
Figure 5:
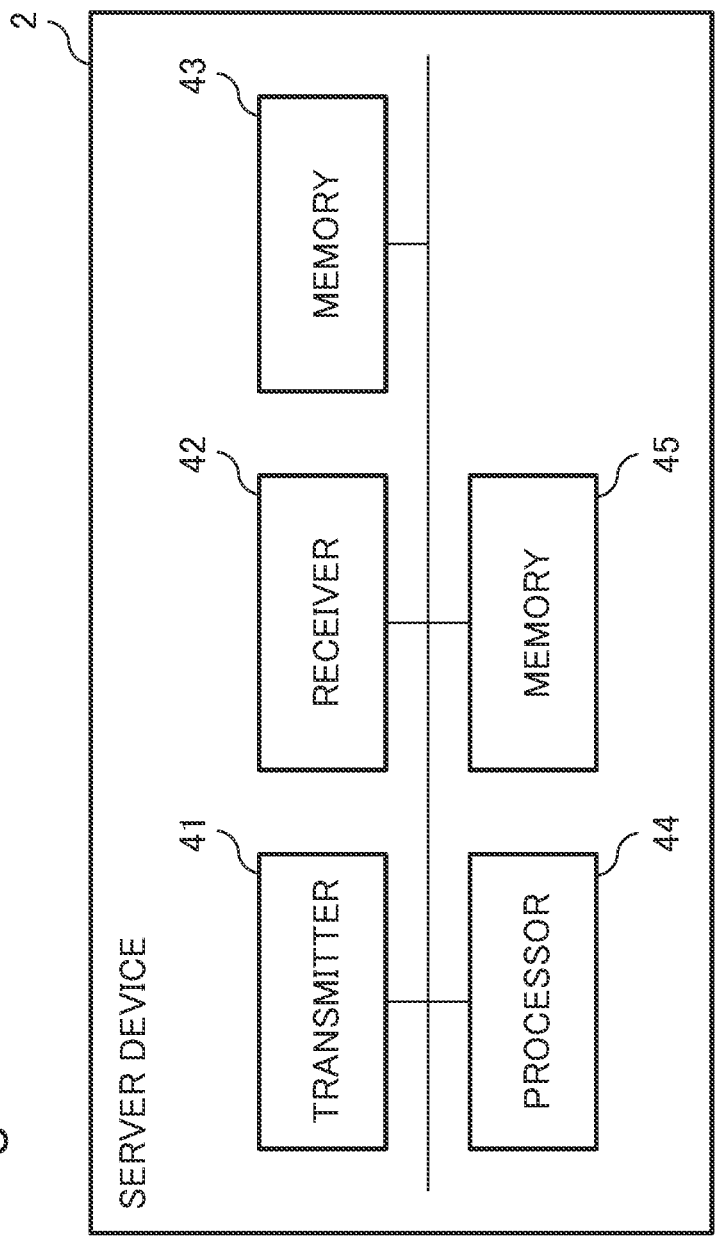
FIG. 5 is a block diagram illustrating a hardware configuration of main units of the server device according to the first example embodiment.

FIG. 1 is a block diagram illustrating main units of a base-station management system according to a first example embodiment. FIG. 2 is a block diagram illustrating main units of a base station device according to the first example embodiment. FIG. 3 is a block diagram illustrating a hardware configuration of main units of the base station device according to the first example embodiment. FIG. 4 is a block diagram illustrating main units of a server device according to the first example embodiment. FIG. 5 is a block diagram illustrating a hardware configuration of main units of the server device according to the first example embodiment. With reference to FIGS. 1 to 5, the base-station management system according to the first example embodiment is described.

As illustrated in FIG. 1, a base-station management system 100 includes N base station devices 1_1 to 1_N. Herein, N is an integer of equal to or more than 1. In other words, the base-station management system 100 includes at least one base station device 1. An individual base station device 1 fulfills a function of a base station for radio communication. Specifically, an individual base station device 1 fulfills, for example, a function of a base station for 3rd generation (3G) communication, a base station for long term evolution (LTE) communication, or a base station for 5th generation (5G) communication.

As illustrated in FIG. 1, the base-station management system 100 includes a server device 2 and a network switch 3. An individual base station device 1 freely communicates with the server device 2 via the network switch 3. In other words, the server device 2 freely communicates with an individual base station device 1 via the network switch 3. The server device 2 communicates with an individual base station device 1 and thereby manages the individual base station device 1. More specifically, the server device 2 maintains and monitors an individual base station device 1. In this manner, main units of the base-station management system 100 are configured.

As illustrated in FIG. 2, an individual base station device 1 includes a first-operation input unit 11, a second-operation input unit 12, a third-operation input unit 13, a light emitting unit 14, a communication unit 15, and a control unit 16.

The first-operation input unit 11 receives input of an operation of setting information (hereinafter, referred to as "location information") indicating a location (e.g., a location on a network) of a relevant base station device 1. The first-operation input unit 11 includes, for example, a plurality of switches (hereinafter, referred to as "a switch group" in some cases) 21 disposed in a row (see FIG. 3). An individual switch included in the switch group 21 includes a physical switch and further includes a switch that freely switches a plurality of states (e.g., two states). A state of an individual switch included in the switch group 21 is relevant to a value of each digit in a numerical value of a plurality of digits indicating a location of a relevant base station device 1.

Specifically, it is assumed that in the base-station management system 100, for example, a location of an individual base station device 1 is represented by a binary number of eight digits relevant to any decimal number from among 0 to 255. In this case, the first-operation input unit 11 includes eight switches. Each of the eight switches includes a switch that freely switches two states (e.g., an ON-state and an OFF-state). A state of each of the eight switches indicates a value (0 or 1) of a relevant digit in a binary number of the state.

In other words, a state of an individual switch included in the switch group 21 is set as a state according to a location of a relevant base station device 1. Specifically, for example, a state of an individual switch included in the switch group 21 is set, when the base station device 1 is newly installed, as a state according to a location of the base station device 1 by a person in charge of construction for installing the base station device 1 (hereinafter, referred to as a "person in charge of installation construction").

The second-operation input unit 12 receives input of an operation of setting necessity of execution of initial setting and restart in a relevant base station device 1. The second-operation input unit 12 includes, for example, a push button 22 (see FIG. 3). A state of the push button 22 is relevant to necessity of execution of initial setting and restart in a relevant base station device 1. More specifically, a state where the push button 22 is depressed indicates that it is necessary to execute initial setting and restart in the base station device 1. In contrast, a state where depression of the push button 22 is released indicates that it is not necessary to execute either initial setting or restart in the base station device 1.

Usually, when an individual base station device 1 is newly installed, it is necessary to execute initial setting and restart. Therefore, when an individual base station device 1 is newly installed, the push button 22 is depressed by a person in charge of installation construction.

The third-operation input unit 13 receives input of an operation of instructing a relevant base station device 1 to start. The third-operation input unit 13 includes, for example, a power supply switch 23 of a relevant base station device 1 (see FIG. 3). Herein, an individual base station device 1 is provided with a mechanism for automatically releasing, when an operation of issuing an instruction for start while the push button 22 is depressed is input (i.e., when an operation of turning on a power supply is input), a depression state of the push button 22 when the base station device 1 is started.

Therefore, when an individual base station device 1 is newly installed, a person in charge of installation construction executes the following operation. First, the person in charge of installation construction sets a state of an individual switch included in the switch group 21 as a state according to a location of the base station device 1. Next, the person in charge of installation construction depresses the push button 22. Then, the person in charge of installation construction operates the power supply switch 23 and thereby turns on a power supply of the base station device 1. When the base station device 1 is started, a depression state of the push button 22 is automatically released.

The light emitting unit 14 includes a light emitting element 24 (see FIG. 3). The light emitting element 24 uses, for example, a light emitting diode (LED). The light emitting element 24 emits, under control of the control unit 16, light in a light emission mode (e.g., a light emission color or a blinking state) according to a state of a relevant base station device 1.

The communication unit 15 communicates, under control of the control unit 16, with the server device 2 via the network switch 3. The communication unit 15 includes a communication module including, for example, a transmitter 25 and a receiver 26 (see FIG. 3).

The control unit 16 includes a function of a dynamic host configuration protocol (DHCP) client for communicating with the server device 2 by using the communication unit 15. The control unit 16 includes a function for transmitting, to the server device 2, various pieces of information used for managing (more specifically, maintaining and monitoring) a relevant base station device 1 by using the communication unit 15. Further, the control unit 16 includes a function for controlling an operation of each of units of a relevant base station device 1. In addition, the control unit 16 includes various functions to be described later.

The control unit 16 includes a computer including a processor 27 and a memory 28 (see FIG. 3). In other words, the memory 28 stores a program relevant to each function of the control unit 16. The processor 27 reads and executes a program stored in the memory 28. Thereby, each function of the control unit 16 is achieved. The processor 27 uses, for example, a central processing unit (CPU). The memory 28 uses, for example, a semiconductor memory.

As illustrated in FIG. 4, the server device 2 includes a communication unit 31, a database storage unit 32, and a control unit 33.

The communication unit 31 communicates, under control of the control unit 33, with an individual base station device 1 via the network switch 3. The communication unit 31 includes a communication module including, for example, a transmitter 41 and a receiver 42 (see FIG. 5).

The database storage unit 32 includes a memory 43 (see FIG. 5). The memory 43 uses, for example, a semiconductor memory or a magnetic disk. The database storage unit 32 stores a database DB as described below.

Usually, information (hereinafter, referred to as "setting information") used for setting a base station device is different depending on a location (e.g., a location on a network) of the base station device. The setting information includes, for example, a base station file (including an operation file and a start file) and base station data. The database DB is a database indicating an association relation between information (i.e., location information) indicating a location of a base station device and setting information. In other words, the database DB is a database indicating setting information relevant to individual location information. In other words, the database DB is a database including, with respect to a plurality of pieces of location information indicating locations different from each other, setting information relevant to each of the plurality of pieces of location information. An association relation between individual location information and individual setting information in the database DB is previously set.

The control unit 33 includes a function of a DHCP server for communicating with an individual base station device 1 by using the communication unit 31. The control unit 33 includes a function for communicating with an individual base station device 1 by using the communication unit 31 and thereby managing (more specifically, maintaining and monitoring) the individual base station device 1. More specifically, the control unit 33 instructs the communication unit 31 to communicate and the communication unit 31 communicates in accordance with the instruction of the control unit 33. The control unit 33 includes a function for controlling an operation of each unit of the server device 2. In addition, the control unit 33 includes various functions to be described later.

The control unit 33 includes a computer including a processor 44 and a memory 45 (see FIG. 5). In other words, the memory 45 stores a program relevant to each function of the control unit 33. The processor 44 reads and executes a program stored in the memory 45. Thereby, each function of the control unit 33 is achieved. The processor 44 uses, for example, a CPU. The memory 45 uses, for example, a semiconductor memory.

Herein, as illustrated in FIG. 2, the control unit 16 of an individual base station device 1 includes a function of each of a necessity determination unit 51, a transmission control unit 52, a reception control unit 53, an initial setting unit 54, and a light-emission control unit 55. As illustrated in FIG. 5, the control unit 33 of the server device 2 includes a function of each of a reception control unit 61, a setting-information selection unit 62, and a transmission control unit 63.

The necessity determination unit 51 determines, when a relevant base station device 1 is started, necessity of execution of initial setting and restart. More specifically, the necessity determination unit 51 determines necessity of execution of initial setting and restart, based on a state of the second-operation input unit 12 at a time when an operation of instructing a relevant base station device 1 to start is input to the third-operation input unit 13.

Specifically, firmware of the control unit 16 includes, for example, an application programming interface (API) for acquiring data indicating a state of the push button 22. The necessity determination unit 51 acquires, by using the API, data indicating a state of the push button 22 at a time when a power supply of a relevant base station device 1 is turned on. When a state of the push button 22 at that time is a depression state, the necessity determination unit 51 determines that it is necessary to execute initial setting and restart. When such a depression state does not occur, the necessity determination unit 51 determines that it is not necessary to execute either initial setting or restart.

Herein, as described above, when an individual base station device 1 is newly installed, the push button 22 is depressed by a person in charge of installation construction. In other words, usually, the push button 22 is depressed when a relevant base station device 1 is newly installed. Therefore, it can be said that determination of necessity based on the necessity determination unit 51 is determination of whether a factor for start of the base station device 1 is new installation of the base station device 1.

The transmission control unit 52 acquires, when the necessity determination unit 51 determines that it is necessary to execute initial setting and restart, information (i.e., location information) indicating a location of a relevant base station device 1. The transmission control unit 52 executes control for transmitting, by using the communication unit 15, the acquired location information to the server device 2. More specifically, the transmission control unit 52 instructs the communication unit 15 to execute transmission and the communication unit 15 executes transmission in accordance with the instruction of the transmission control unit 52. Herein, the location information is based on a state of the first-operation input unit 11.

Specifically, firmware of the control unit 16 includes, for example, an API for acquiring data indicating a state of an individual switch included in the switch group 21. The transmission control unit 52 acquires, by using the API, data indicating a state of an individual switch included in the switch group 21. The transmission control unit 52 acquires, based on the acquired data, location information (e.g., a binary number of eight digits) relevant to a state of the switch group 21.

Herein, when the necessity determination unit 51 determines that it is necessary to execute initial setting and restart, the transmission control unit 52 may execute control for adding location information to the server device 2 and transmitting, to the server device 2, information (hereinafter, referred to as "new installation information) indicating that a relevant base station device 1 has been newly installed.

The transmission control unit 52 may execute control for transmitting, when start processing for a relevant base station device 1 is completed, a message indicating such completion (hereinafter, referred to as a "start completion message") to the server device 2. Location information and new installation information may be transmitted together with the start completion message when the start completion message is transmitted. Hereinafter, information transmitted, together with a start completion message, to the server device 2 may be collectively referred to as "additional information".

The reception control unit 61 executes control for receiving, when an individual base station device 1 transmits a start completion message and additional information, the transmitted start completion message and additional information by using the communication unit 31. More specifically, the reception control unit 61 instructs the communication unit 31 to execute reception and the communication unit 31 executes reception in accordance with the instruction of the reception control unit 61. As described above, when an individual base station device 1 is newly installed, additional information transmitted when the base station device 1 is started includes new installation information and location information.

As described above, the database DB in the database storage unit 32 includes setting information relevant to each of a plurality of pieces of location information (e.g., 256 pieces of location information) indicating locations different from each other. In other words, the database DB includes a plurality of pieces of setting information relevant to the plurality of pieces of location information. The setting-information selection unit 62 determines whether new installation information is included in additional information received from the reception control unit 61. When new installation information is included in the received additional information, the setting-information selection unit 62 selects, from among a plurality of pieces of setting information included in the database DB, setting information relevant to location information included in the received additional information.

The transmission control unit 63 executes control for transmitting setting information selected by the setting-information selection unit 62 to a base station device 1 having transmitted relevant location information. In order to transmit the selected setting information, the communication unit 31 is used.

The transmission control unit 63 may execute control for transmitting, when new installation information is included in the received additional information, a signal indicating an instruction for execution of initial setting (hereinafter, referred to as an "activation instruction") to a base station device 1 having transmitted the additional information. Setting information may be transmitted together with the activation instruction when the activation instruction is transmitted.

The reception control unit 53 executes control for receiving, by using the communication unit 15, an activation instruction and setting information transmitted by the server device 2. More specifically, the reception control unit 53 instructs the communication unit 15 to execute reception and the communication unit 15 executes reception in accordance with the instruction of the reception control unit 53. In other words, the reception control unit 53 executes control for downloading an activation instruction and setting information.

The initial setting unit 54 executes, by using the received setting information, initial setting of a relevant base station device 1. Herein, the initial setting includes processing (so-called "activation") of applying a file or data included in the received setting information. Subsequently, the initial setting unit 54 executes restart (so-called "reset") for a relevant base station device 1. Thereby, activated setting is reflected.

The light-emission control unit 55 controls light emission of the light emitting unit 14 according to a state of a relevant base station device 1. More specifically, the light-emission control unit 55 controls light emission of the light emitting unit 14 according to a transmission state of a start completion message and additional information, a reception state of an activation instruction and setting information, and an execution state of initial setting. A person in charge of installation construction views the light emission and thereby can visually recognize a state of the base station device 1.

Specifically, the light-emission control unit 55 causes, when, for example, a relevant base station device 1 is transmitting a start completion message and additional information to the server device 2, the light emitting unit 14 to emit light in a predetermined light emission mode (e.g., a light emission color or a blinking state). A person in charge of installation construction views the light emission and thereby can visually recognize that the base station device 1 is transmitting a start completion message and additional information.

Next, the light-emission control unit 55 causes, when a relevant base station device 1 is receiving an activation instruction and setting information, the light emitting unit 14 to emit light in another predetermined light emission mode (e.g., a light emission color or a blinking state). A person in charge of installation construction views the light emission and thereby can visually recognize that the base station device 1 is receiving the activation instruction and setting information.

Next, the light-emission control unit 55 causes, when a relevant base station device 1 is executing initial setting, the light emitting unit 14 to emit light in further another predetermined light emission mode (e.g., a light emission color or a blinking state). A person in charge of installation construction views the light emission and thereby can visually recognize that the base station device 1 is executing initial setting (i.e., activating a file or data included in setting information).

Next, the light-emission control unit 55 causes, when a relevant base station device 1 is restarted, the light emitting unit 14 to emit light in further another predetermined light emission mode (e.g., a light emission color or a blinking state). A person in charge of installation construction views the light emission and thereby can visually recognize that initial setting has been completed and restart is about to be executed.

The light-emission control unit 55 may cause, when start processing for a relevant base station device 1 is completed, the light emitting unit 14 to emit light in further another predetermined light emission mode (e.g., a light emission color or a blinking state). A person in charge of installation construction views the light emission and thereby can visually recognize that start processing has been completed.

The light-emission control unit 55 may cause, when the server device 2 is maintaining and monitoring a relevant base station device 1, the light emitting unit 14 to emit light in further another predetermined light emission mode (e.g., a light emission color or a blinking state). A person in charge of installation construction views the light emission and thereby can visually recognize that maintenance and monitoring are being executed.

Figure 6:
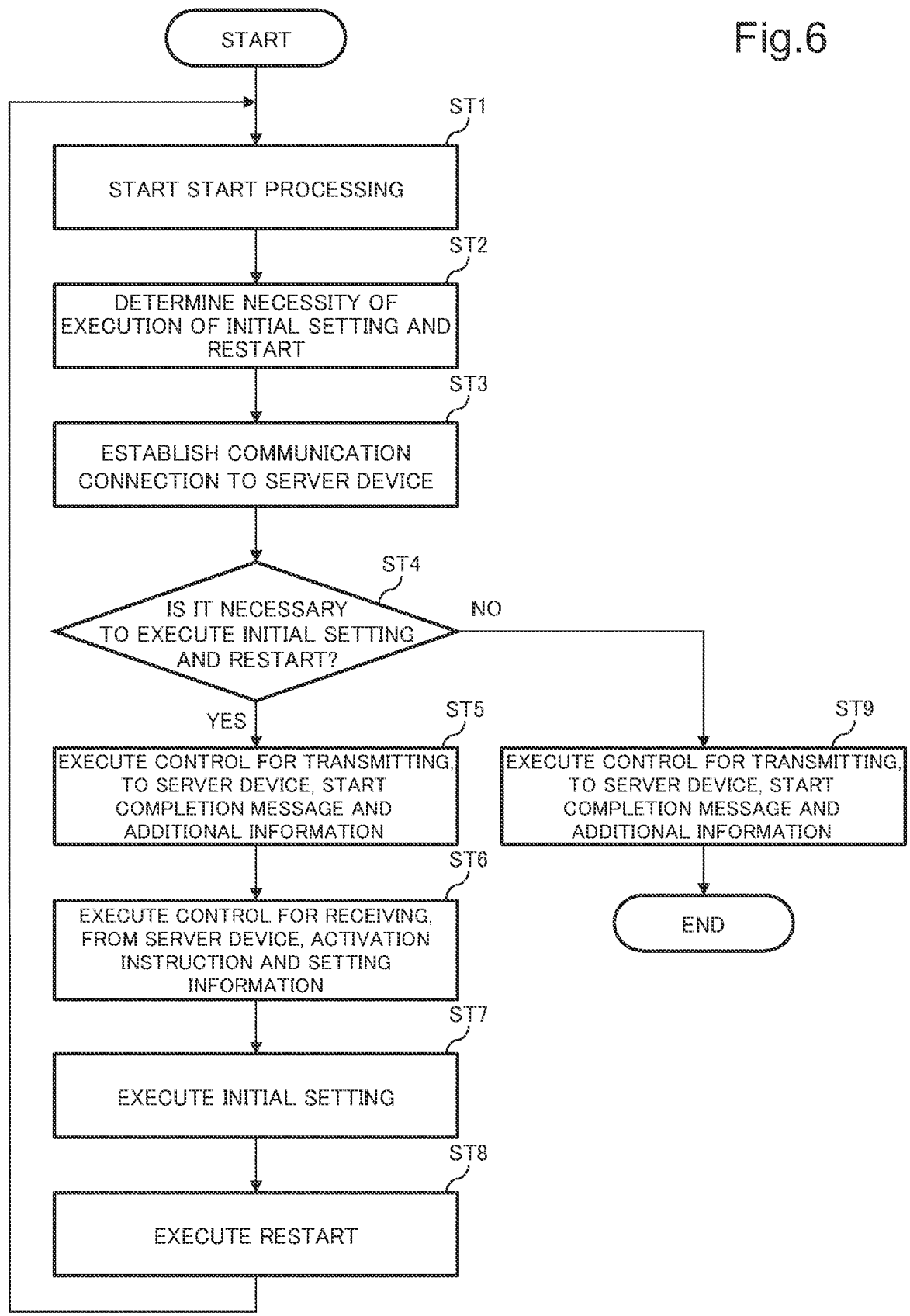
FIG. 6 is a flowchart illustrating an operation of the base station device according to the first example embodiment.

Next, with reference to a flowchart illustrated in FIG. 6, an operation of an individual base station device 1 is described by focusing on an operation of the control unit 16. More specifically, an operation in which the base station device 1 is newly installed is mainly described.

First, when an operation of issuing an instruction for starting the base station device 1 is input to the third-operation input unit 13, the control unit 16 starts start processing for the base station device 1 (step ST1). More specifically, when the power supply switch 23 is operated and thereby a power supply of the base station device 1 is turned on, the control unit 16 starts start processing for the base station device 1.

Next, the necessity determination unit 51 of the control unit 16 determines necessity of execution of initial setting and restart (step ST2). More specifically, the necessity determination unit 51 determines, based on a state of the second-operation input unit 12 at a time when an operation of instructing the base station device 1 to start is input to the third-operation input unit 13, necessity of execution of initial setting and restart. In other words, the necessity determination unit 51 determines, based on a state of the push button 22 at a time when a power supply of the base station device 1 is turned on, necessity of execution of initial setting and restart.

Herein, the necessity determination unit 51 may set, when it is determined that it is necessary to execute initial setting and restart, a predetermined flag as an ON-state. In contrast, the necessity determination unit 51 may set, when it is determined that it is not necessary to execute either initial setting or restart, the flag as an OFF-state.

Next, the control unit 16 establishes communication connection to the server device 2 (step ST3). More specifically, the control unit 16 resolves, by using a DHCP, an Internet protocol (IP) address of the server device 2. In other words, the control unit 16 acquires an IP address of the server device 2. Thereby, the control unit 16 establishes IP connection to the server device 2. Establishment of the communication connection may be included in start processing. In other words, establishment of the communication connection may be executed as a part of start processing.

When the necessity determination unit 51 determines that it is necessary to execute initial setting and restart ("YES" in step ST4), i.e., the flag is being set as an ON-state, the transmission control unit 52 of the control unit 16 acquires information (i.e., location information) indicating location of the base station device 1. The transmission control unit 52 executes control for transmitting, when start processing of the base station device 1 is completed, a start completion message and additional information to the server device 2 (step ST5). The additional information in this case includes new installation information and location information. The location information is based on a state of the first-operation input unit 11. Specifically, the location information uses, for example, a binary number relevant to a state of an individual switch included in the switch group 21.

The transmitted start completion message and additional information are received by the server device 2. Then, the server device 2 selects, from among a plurality of pieces of setting information included in the database DB, setting information relevant to location information included in the additional information. Then, the server device 2 transmits an activation instruction and the selected setting information to the base station device 1. An operation of the server device 2 is described later with reference to FIG. 7.

Next, the reception control unit 53 of the control unit 16 executes control for receiving an activation instruction and setting information transmitted by the server device 2 (step ST6).

Next, the initial setting unit 54 of the control unit 16 executes, based on the received activation instruction, initial setting of the base station device 1 (step ST7). The initial setting includes processing of applying (i.e., activating) a file or data included in the received setting information. Then, the initial setting unit 54 executes restart (i.e., reset) for the base station device 1 (step ST8).

When the base station device 1 is restarted, processing of the control unit 16 returns to step ST1. Thereby, processing of steps ST1 to ST3 is executed again. However, when the base station device 1 is restarted (i.e., when a power supply of the base station device 1 is turned on again), a depression state of the push button 22 has been already released. Therefore, in step ST2 at a second time, the necessity determination unit 51 determines that it is not necessary to execute either initial setting or restart. Therefore, the flag is set as an OFF-state and step ST4 becomes in a state of "NO".

In this case, the transmission control unit 52 executes control for transmitting, when start processing for the base station device 1 is completed, a start completion message to the server device 2 (step ST9). At that time, as additional information, the following information may be transmitted to the server device 2, together with the start completion message. In other words, information (hereinafter, referred to as "version information") indicating a version of a file or data applied in initial setting in step ST7 may be transmitted to the server device 2.

In FIG. 6, illustration of an operation of the light-emission control unit 55 is omitted. When, for example, start processing for the base station device 1 is completed, the light-emission control unit 55 executes control for causing the light emitting unit 14 to emit light in a predetermined light emission mode. When the base station device 1 is transmitting a start completion message and additional information (each of steps ST5 and ST9), the light-emission control unit 55 executes control for causing the light emitting unit 14 to emit light in another predetermined light emission mode. When the base station device 1 is receiving an activation instruction and setting information (step ST6), the light-emission control unit 55 executes control for causing the light emitting unit 14 to emit light in further another predetermined light emission mode. When the base station device 1 is executing initial setting (step ST7), the light-emission control unit 55 executes control for causing the light emitting unit 14 to emit light in further another predetermined light emission mode. When the server device 2 is maintaining and monitoring the base station device 1 (after step ST9), the light-emission control unit 55 executes control for causing the light emitting unit 14 to emit light in further another predetermined light emission mode.

Figure 7:
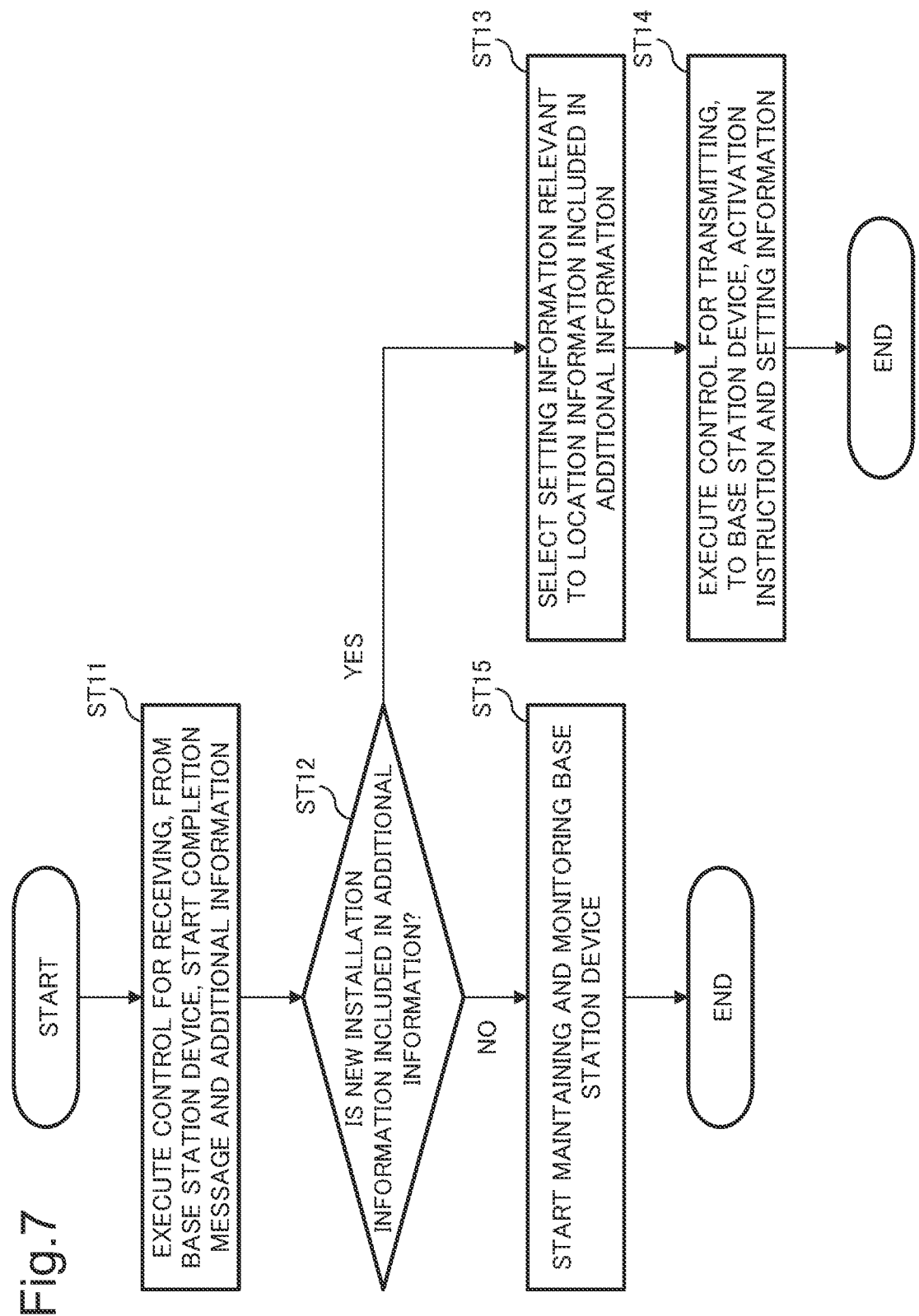
FIG. 7 is a flowchart illustrating an operation of the server device according to the first example embodiment.

Next, with reference to a flowchart illustrated in FIG. 7, an operation of the server device 2 is described by focusing on an operation of the control unit 33. More specifically, an operation in which an individual base station device 1 is newly installed is mainly described.

As described with reference to FIG. 6, when an individual base station device 1 is newly installed and then start processing is completed, the base station device 1 transmits, to the server device 2, a start completion message and additional information (including new installation information and location information) (step ST5). Thereafter, when second start processing is completed, the base station device 1 transmits, to the server device 2, a start completion message and additional information (including version information) (step ST9).

The reception control unit 61 of the control unit 33 executes control for receiving the transmitted start completion message and additional information (step ST11).

When new installation information is included in the received additional information ("YES" in step ST12), the setting-information selection unit 62 of the control unit 33 selects, from among a plurality of pieces of setting information included in the database DB, setting information relevant to location information included in the received additional information (step ST13).

Next, the transmission control unit 63 of the control unit 33 executes control for transmitting an activation instruction and the selected setting information to a base station device 1 having transmitted the received activation completion message and additional information (step ST14). Thereby, in the base station device 1, initial setting (step ST7) and restart (step ST8) are executed.

In contrast, when new installation information is not included in the received additional information ("NO" in step ST12), initial setting and restart of the base station device 1 has been already completed. In this case, the control unit 33 starts maintaining and monitoring the base station device 1 (step ST15).

Next, advantageous effects achieved by using the base-station management system 100 are described.

When an individual base station device 1 is newly installed, the push button 22 is depressed and thereby the necessity determination unit 51 determines that it is necessary to execute initial setting and restart. In this case, the transmission control unit 52 executes control for transmitting additional information including location information to the server device 2. The reception control unit 53 executes control for receiving, from the server device 2, setting information relevant to the transmitted location information. The initial setting unit 54 executes initial setting by using the received setting information.

In other words, when an individual base station device 1 is newly installed, additional information including location information is automatically transmitted to the server device 2. Further, relevant setting information is automatically received from the server device 2. Thereby, when a location of the installed base station device 1 is notified to the server device 2, phone communication by a person in charge of installation construction to an operator of the server device 2 can be made unnecessary. Therefore, compared with a case using the technique described in PTL 1, initial setting at a time when an individual base station device 1 is newly installed can be easily achieved.

The phone communication is made unnecessary, and thereby occurrence of a time loss due to connection difficulty in a phone call can be avoided. As a result, contribution to man-hour reduction in installation work of the base station device 1 by a person in charge of installation construction can be achieved. Contribution to early beginning of use of the base station device 1 can be achieved.

The phone communication is made unnecessary, and thereby occurrence of an error in transmission of location information to an operator by a person in charge of installation construction can be avoided. Thereby, occurrence of a setting error of location information of an individual base station device 1 in the base-station management system 100 can be avoided.

In the server device 2, the reception control unit 61 executes control for receiving the transmitted additional information. The setting-information selection unit 62 selects setting information relevant to location information included in the received additional information. The transmission control unit 63 executes control for transmitting the selected setting information to a relevant base station device 1.

In other words, when additional information including location information is transmitted by a newly-installed base station device 1, relevant setting information is automatically selected. The selected setting information is automatically transmitted to a relevant base station device 1. Thereby, needless to say, phone communication as described above can be made unnecessary, and work for inputting location information by an operator of the server device 2 can be made unnecessary. As a result, compared with a case using the technique described in PTL 1, initial setting at a time when an individual base station device 1 is newly installed can be easily achieved.

The work is made unnecessary, and thereby occurrence of an error in input of location information to the server device 2 by an operator can be avoided. Thereby, occurrence of an error in setting of location information of an individual base station device 1 in the base-station management system 100 can be avoided.

Next, a modified example of the base-station management system 100 is described.

Location information may be information indicating a location on a network or a geographical location of an individual base station device 1 and is not limited to the above-described specific example (i.e., a binary number relevant to a state of the switch group 21). Location information may use, for example, a number allocated to an individual base station device 1, an IP address allocated to an individual base station device 1, or location coordinates (more specifically, a latitude and a longitude) of an individual base station device 1. Location coordinates of an individual base station device 1 may be acquired by using a global positioning system (GPS).

The server device 2 may include a plurality of servers. The plurality of servers may be accommodated in housings independent of each other. The plurality of serves may include, for example, a first server including a function of a DHCP server, a second server including a function for maintaining and monitoring an individual base station device 1, and a third server including a function of the database storage unit 32 and the setting-information selection unit 62.

When initial setting of an individual base station device 1 is executed, a case where it is not necessary to execute restart may occur. Therefore, the initial setting unit 54 may not necessarily execute, when executing initial setting, restart. In other words, the initial setting unit 54 may execute, between initial setting and restart, only initial setting. The necessity determination unit 51 may determine necessity of execution of initial setting.

Figure 8:
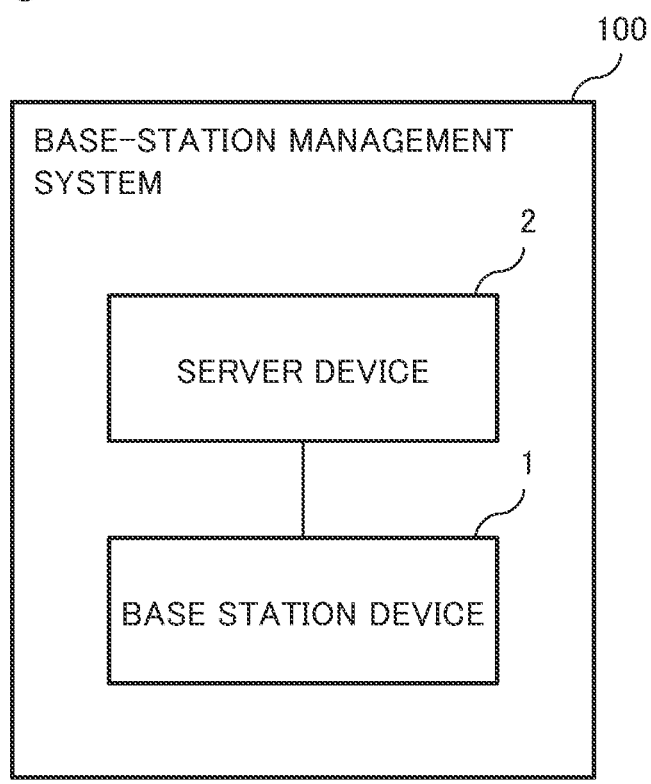
FIG. 8 is a block diagram illustrating main units of another base-station management system according to the first example embodiment.

Next, with reference to FIG. 8, another modified example of the base-station management system 100 is described. Further, with reference to FIG. 9, a modified example of the base station device 1 is described. In addition, with reference to FIG. 10, a modified example of the server device 2 is described.

Figure 9:
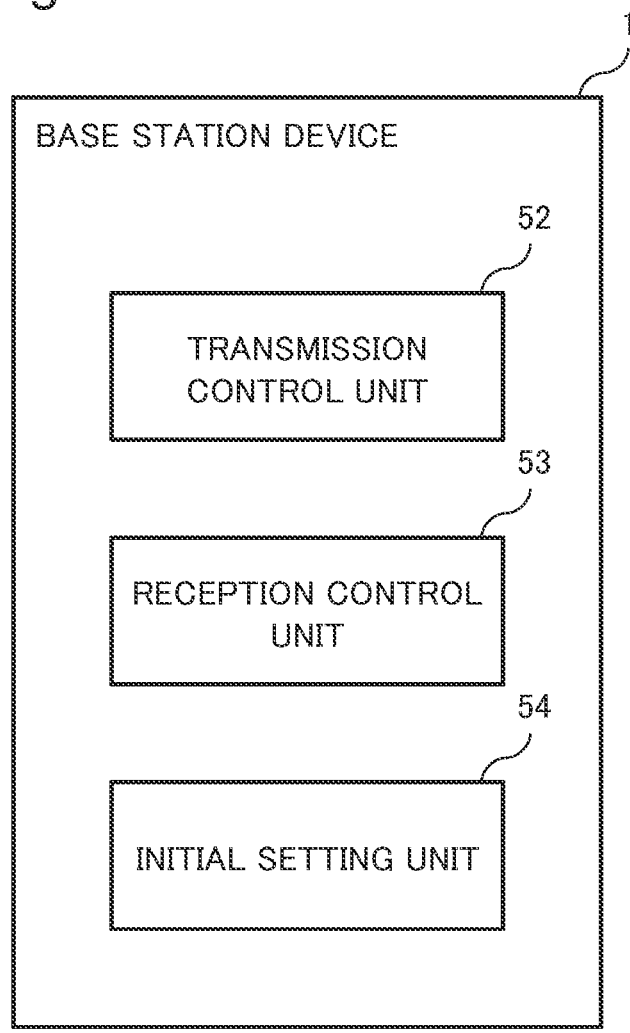
FIG. 9 is a block diagram illustrating main units of another base station device according to the first example embodiment.
Figure 10:
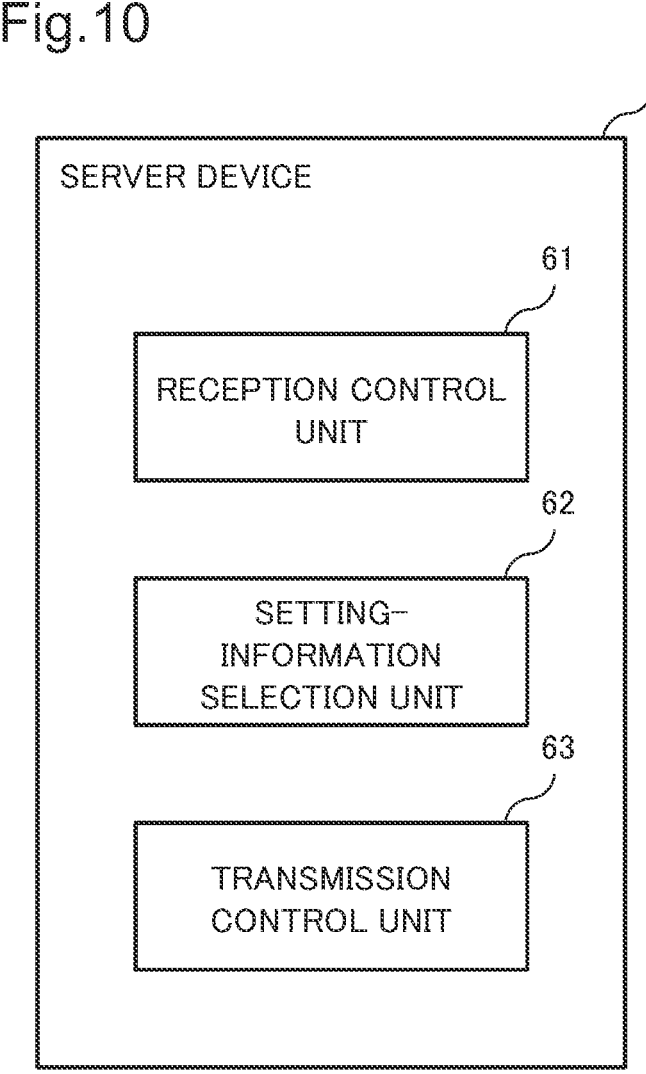
FIG. 10 is a block diagram illustrating main units of another server device according to the first example embodiment.

As illustrated in FIG. 8, the base-station management system 100 may include a base station device 1 and a server device 2. In other words, main units of the base-station management system 100 are configured by using a base station device 1 and a server device 2. Herein, as illustrated in FIG. 9, the base station device 1 may include a transmission control unit 52, a reception control unit 53, and an initial setting unit 54. In other words, main units of the base station device 1 are configured by using a transmission control unit 52, a reception control unit 53, and an initial setting unit 54. As illustrated in FIG. 10, the server device 2 may include a reception control unit 61, a setting-information selection unit 62, and a transmission control unit 63. In other words, main units of the server device 2 are configured by using a reception control unit 61, a setting-information selection unit 62, and a transmission control unit 63. Also in this case, advantageous effects as described above can be achieved.

In other words, in the base station device 1, when the base station device 1 is started, the transmission control unit 52 executes control for transmitting location information relevant to the base station device 1 to the server device 2. The reception control unit 53 executes control for receiving, from the server device 2, setting information relevant to location information, the setting information being setting information used for setting the base station device 1. The initial setting unit 54 executes, by using setting information, initial setting of the base station device 1.

In contrast, in the server device 2, the reception control unit 61 executes control for receiving location information transmitted by the base station device 1 at a time of start of the base station device 1, the location information being location information relevant to the base station device 1. The setting-information selection unit 62 selects, from among a plurality of pieces of setting information relevant to a plurality of pieces of location information indicating locations different from each other, setting information relevant to the location information transmitted from the base station device 1. The transmission control unit 63 executes control for transmitting, to the base station device 1, setting information used for initial setting in the base station device 1, the setting information being the setting information selected by the setting-information selection unit 62.

Thereby, when initial setting of the base station device 1 is achieved, phone communication by a person in charge of installation construction to an operator of the server device 2 can be made unnecessary. As a result, compared with a case using the technique described in PTL 1, initial setting can be easily achieved.

Usually, information used for setting a base station device is different depending on a location (e.g., a location on a network) of the base station device. Therefore, when the information is downloaded from a server device, it is necessary to notify the server device of a location of the base station device.

Herein, in the technique described in PTL 1, when a base station device is newly installed, a person in charge of installation construction of the base station device performs phone communication with an operator of a server device, and thereby a location (more specifically, a network address) of the base station device is notified (see paragraph [0048] of PTL 1). The notified location is input to the server device by the operator (see paragraph in PTL 1). In this manner, phone communication by a person in charge of installation construction of a base station device and input work by an operator of a server device are required, and therefore there has been a problem in that work for executing initial setting of a base station device is cumbersome.

According to the present disclosure, initial setting of a base station device can be easily achieved.

While the disclosure has been particularly shown and described with reference to example embodiments thereof, the disclosure is not limited to these embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

[Supplementary Notes]

[Supplementary Note 1]

A base station device including:

a transmission control unit that executes control for transmitting, when the base station device is started, location information relevant to the base station device to a server device;

a reception control unit that executes control for receiving, from the server device, setting information relevant to the location information, the setting information being used for setting the base station device; and an initial setting unit that executes initial setting of the base station device by using the setting information.

[Supplementary Note 2]

The base station device according to supplementary note 1, further including a first-operation input unit that receives input of an operation of setting the location information, wherein the location information being set by the first-operation input unit is transmitted to the server device.

[Supplementary Note 3]

The base station device according to supplementary note 2, wherein the first-operation input unit includes a switch group, the location information includes a numerical value of a plurality of digits, and a state of an individual switch included in the switch group is relevant to a value of an individual digit in the numerical value of a plurality of digits.

[Supplementary Note 4]

The base station device according to any one of supplementary notes 1 to 3, further including a necessity determination unit that determines, when the base station device is started, necessity of execution of the initial setting, wherein, when it is determined that it is necessary to execute the initial setting, the transmission control unit executes control for transmitting the location information to the server device, the reception control unit executes control for receiving the setting information, and the initial setting unit executes the initial setting.

[Supplementary Note 5]

The base station device according to supplementary note 4, further including a second-operation input unit that receives input of an operation of setting necessity of execution of the initial setting, wherein the necessity determination unit determines, based on a state of the second-operation input unit, necessity of execution of the initial setting.

[Supplementary Note 6]

The base station device according to supplementary note 5, wherein the second-operation input unit is a push button to be depressed when the base station device is installed.

[Supplementary Note 7]

The base station device according to supplementary note 6, further including a third-operation input unit that receives input of an operation of instructing the base station device to start, wherein, when an operation of instructing the base station device to start is input while the push button is depressed, a depression state of the push button is automatically released when the base station device is started.

[Supplementary Note 8]

The base station device according to supplementary note 7, wherein the third-operation input unit is a power supply switch of the base station device.

[Supplementary Note 9]

The base station device according to any one of supplementary notes 1 to 8, further including:

a light emitting unit; and a light-emission control unit that controls light emission of the light emitting unit according to a transmission state of the location information, a reception state of the setting information, and an execution state of the initial setting.

[Supplementary Note 10]

A base-station management system including:

the base station device according to any one of supplementary notes 1 to 9; and the server device.

[Supplementary Note 11]

A server device including:

a reception control unit that executes control for receiving location information transmitted by a base station device at a time of start of the base station device, the location information being relevant to the base station device;

a setting-information selection unit that selects, from among a plurality of pieces of setting information relevant to a plurality of pieces of location information indicating locations different from one another, setting information relevant to the location information transmitted by the base station device; and a transmission control unit that executes control for transmitting, to the base station device, setting information to be used for initial setting in the base station device, the setting information being selected by the setting-information selection unit.

[Supplementary Note 12]

The server device according to supplementary note 11, storing a database including the plurality of pieces of setting information.

[Supplementary Note 13]

A base-station management system including:

the server device according to supplementary note 11 or 12; and the base station device.

[Supplementary Note 14]

A program for causing a computer of a base station device to function as:

a transmission control unit that executes control for transmitting, when the base station device is started, location information relevant to the base station device to a server device;

a reception control unit that executes control for receiving, from the server device, setting information relevant to the location information, the setting information being used for setting the base station device; and an initial setting unit that executes initial setting of the base station device by using the setting information.

[Supplementary Note 15]

A recording medium storing the program according to supplementary note 14.

[Supplementary Note 16]

A program for causing a computer of a server device to function as:

a reception control unit that executes control for receiving location information transmitted by a base station device at a time of start of the base station device, the location information being relevant to the base station device;

a setting-information selection unit that selects, from among a plurality of pieces of setting information relevant to a plurality of pieces of location information indicating locations different from one another, setting information relevant to the location information transmitted by the base station device; and a transmission control unit that executes control for transmitting, to the base station device, setting information to be used for initial setting in the base station device, the setting information being selected by the setting-information selection unit.

[Supplementary Note 17]

A recording medium storing the program according to supplementary note 16.

[Supplementary Note 18]

A control method for a base station device, the method including:

executing control for transmitting, by a transmission control unit, when the base station device is started, location information relevant to the base station device to a server device;

executing control for receiving, by a reception control unit, from the server device, setting information relevant to the location information, the setting information being used for setting the base station device; and executing, by an initial setting unit, initial setting of the base station device by using the setting information.

[Supplementary Note 19]

A control method for a server device, the method including:

executing control for receiving, by a reception control unit, location information transmitted by a base station device at a time of start of the base station device, the location information being relevant to the base station device;

selecting, by a setting-information selection unit, from among a plurality of pieces of setting information relevant to a plurality of pieces of location information indicating locations different from one another, setting information relevant to the location information transmitted by the base station device; and executing control for transmitting, by a transmission control unit, to the base station device, setting information to be used for initial setting in the base station device, the setting information being selected by the setting-information selection unit.

REFERENCE SIGNS LIST

1 Base station device
2 Server device
3 Network switch
11 First-operation input unit
12 Second-operation input unit
13 Third-operation input unit
14 Light emitting unit
15 Communication unit
16 Control unit
21 Switch group
22 Push button
23 Power supply switch
24 Light emitting element
25 Transmitter
26 Receiver
27 Processor
28 Memory
31 Communication unit
32 Database storage unit
33 Control unit
41 Transmitter
42 Receiver
43 Memory
44 Processor
45 Memory
51 Necessity determination unit
52 Transmission control unit
53 Reception control unit
54 Initial setting unit
55 Light-emission control unit
61 Reception control unit
62 Setting-information selection unit
63 Transmission control unit

The invention claimed is:

1. A base station device comprising:
a memory; and
a processor coupled to the memory,
wherein the processor is configured to:
execute control for transmitting, when the base station device is started, location information relevant to the base station device to a server device, the location information being set in the base station device;
execute control for receiving, from the server device, setting information relevant to the location information, the setting information being used for setting the base station device, wherein the location information indicates a geographic location; and
execute initial setting of the base station device by using the setting information, and wherein
the base station device further comprising a first-operation receiver that receives input of an operation of setting the location information,
the location information being set by the first-operation receiver is transmitted to the server device,
the first-operation receiver includes a switch group, wherein the switch group comprises a plurality of individual physical switches,
the location information includes a numerical value of a plurality of digits, and
each state of each individual physical switch included in the [switch group] plurality of individual physical switches indicates a value of a corresponding digit in the numerical value of the plurality of digits.

2. The base station device according to claim 1, wherein the processor is configured to determine, when the base station device is started, necessity of execution of the initial setting, and
when it is determined that it is necessary to execute the initial setting, the processor executes the control for transmitting the location information to the server device, executes control for receiving the setting information, and executes the initial setting.

3. The base station device according to claim 2, further comprising
a second-operation receiver that receives input of an operation of setting necessity of execution of the initial setting, wherein
the processor determines, based on a state of the second-operation receiver, necessity of execution of the initial setting.

4. The base station device according to claim 3, wherein the second-operation receiver is a push button to be depressed when the base station device is installed.

5. The base station device according to claim 4, further comprising
a third-operation receiver that receives input of an operation of instructing the base station device to start, wherein,
when an operation of instructing the base station device to start is input while the push button is depressed, a depression state of the push button is automatically released when the base station device is started.

6. The base station device according to claim 5, wherein the third-operation receiver is a power supply switch of the base station device.

7. The base station device according to claim 1, further comprising:
a light emitter; and
a light-emission controller that controls light emission of the light emitter according to a transmission state of the location information, a reception state of the setting information, and an execution state of the initial setting.

8. A base-station management system comprising:
the base station device according to claim 1; and
the server device.

9. A control method for a base station device, the method comprising:
executing control for transmitting, when the base station device is started, location information relevant to the base station device to a server device, the location information being set in the base station device, wherein the location information indicates a geographic location;
executing control for receiving, from the server device, setting information relevant to the location information, the setting information being used for setting the base station device; and
executing, initial setting of the base station device by using the setting information, the method further comprising:
receiving, by a first-operation receiver, an input operation of setting information; and
transmitting the location information to the server device, wherein the first-operation receiver includes a switch group, the switch group comprises a plurality of individual physical switches, the location information includes a numerical value of a plurality of digits, and each state of each individual physical switch included in the plurality of individual physical switches indicates a value of a corresponding digit in the numerical value of the plurality of digits.

* * * * *